Sept. 29, 1942.  J. B. BAMBENEK  2,297,277
CHAIN SWIVEL
Filed June 16, 1941
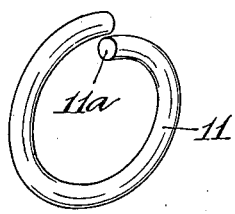
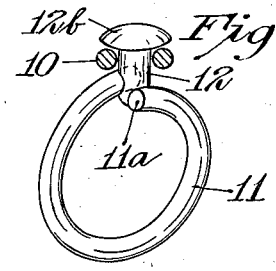
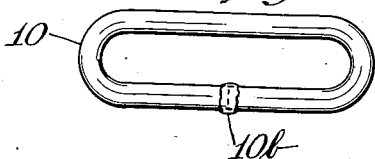
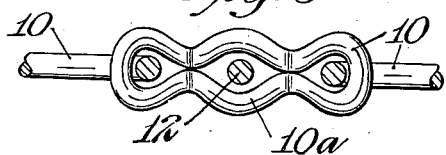
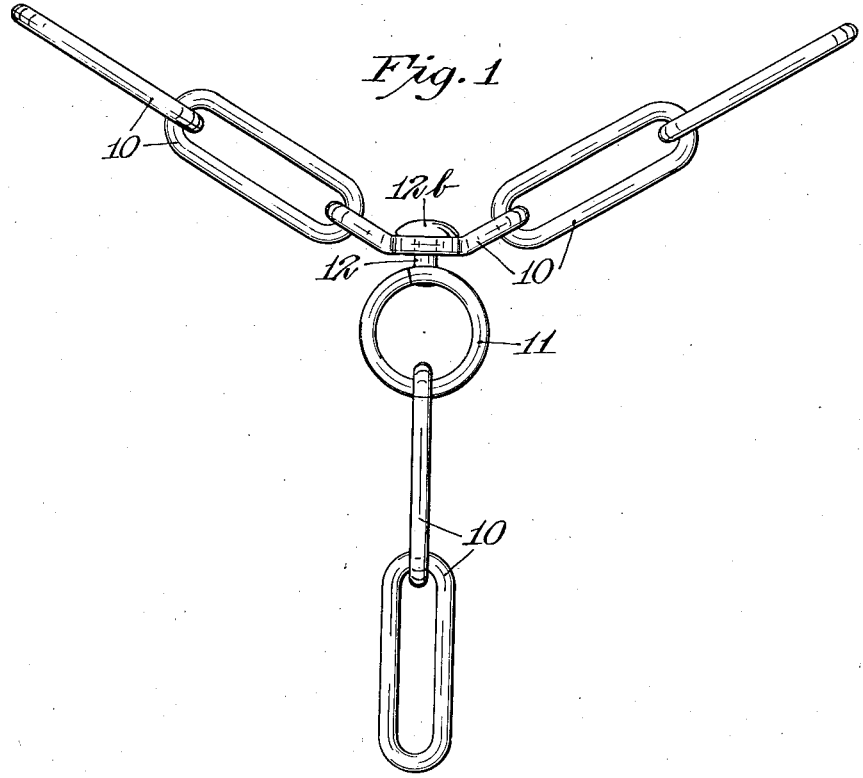
Inventor
Joseph B. Bambenek
By Merchant & Merchant
Attorneys Patented Sept. 29, 1942

2,297,277

UNITED STATES PATENT OFFICE 2,297,277

CHAIN SWIVEL

Joseph B. Bambenek, Winona, Minn., assignor to Peerless Chain Company, Winona, Minn., a corporation of Minnesota Application June 16, 1941, Serial No. 398,262

2 Claims. (Cl. 59—95)

My present invention provides an improved chain swivel.

Swivels, as is well-known, are used in many devices. As an example, chain swivels are employed in so-called "cow hitch chains" wherein an anchoring chain is connected to an intervening link of a neck chain that is arranged to be applied around the neck of the cow or animal. My invention provides an extremely simple and highly efficient swivel for the above specific and various other analogous applications.

Ordinary link chains, having links that are round are of common form, can be produced, at low cost, by automatic machines. One of the objects of my invention has been to provide a chain in which all of the links may be uniformly made by an automatic machine, and one of the links, by a simple operation, converted into the socket-forming element of the swivel; and this object I accomplish by a simple distortion of one of the links primarily formed by the machine.

Another object of the invention has been to provide the other member of the swivel, to wit: the swivel pin element that may be cheaply made, quickly assembled, in swivel connection with the socket-forming link.

These objects and others, which will hereinafter appear, are accomplished by my invention.

A preferred form of the improved swivel structure and the modified form thereof are illustrated in the accompanying drawing wherein like characters indicate like parts throughout the several views.

Referring to the drawing:

Fig. 1 is a plan view showing links and swivel of a chain structure which, for the purpose of illustration, may be assumed to be a cow hitch chain;

Fig. 2 is a view in perspective showing a split link to which the swivel pin is adapted to be secured;

Fig. 3 is a side elevation of the swivel pin which forms an element of the swivel;

Fig. 4 is a view in perspective showing a swivel pin connected to the link shown in Fig. 2 and applied through the distorted link which forms the swivel socket member;

Fig. 5 is a plan view showing one of the links of the chain as primarily formed; and Fig. 6 is a section taken on the irregular line 6—6 of Fig. 1 showing a link such as illustrated in Fig. 5 distorted to form the socket swivel.

Describing first the preferred structure illustrated in Figs. 1 to 6, inclusive, the numeral 10 indicates the chain links as primarily made and of oblong form. When one of the intermediate links of that portion of the chain, which we will assume for illustration is to go around the cow's neck, and which is illustrated in detail in Fig. 5, is distorted, as shown in Fig. 6, it is then formed with an intermediate as well as end loops. This distorted link is indicated by the numeral 10a.

The numeral 11 indicates a chain link that is preferably substantially round and which is split at one point and formed with circumferential overlapping laterally spaced ends 11a. This link 11 can be assumed to be the end link of that portion of the chain structure which may be designated as the hitch chain.

The numeral 12 indicates the swivel pin or stud which is provided at one end with a head 12a and at its ends, preferably and for an important reason, is provided with diametrically opposite notches 12b close to its end. In assembling the elements the swivel pin 12 is inserted through the intermediate loop of the distorted link 10a and the notched end thereof is then forced and inserted between the overlapping ends of the link 11. Fig. 1 shows the said parts thus assembled and when the parts are thus assembled, it is a very easy matter to place the ends of the link 11 between the electrodes of an electric welding apparatus and thereby quickly and very rigidly weld the ends of said link to the end of the swivel pin. It is important to note that the ends of the link 11 will, under spring tension of the link itself, be very firmly pressed into the notches 12b of the swivel pin, thereby quite firmly holding the parts together in swivelled relation even before the welding of the link 11 to the pin 12 has been performed.

In actual practice the above described structure and the scheme involved has made simple what was hitherto found to be a very expensive operation necessary in producing chain swivels.

Hitherto the assembling and holding of the swivel-forming elements together, while they are being connected by the welding operation, has been difficult and slow to perform, making the cost too high for commercial success.

In producing the improved swivel in accordance with the improved process, the links 11 and the swivel pins 12 are first individually made. The chain links 10 are first made in the form shown in detail in Figs. 1 and 5, the said links being welded at the points marked 10b on Fig. 5. One of these links, while coupled with other links of the chain, is then distorted by a simple press operation to the form shown in Fig. 6. Next, the swivel pin 12 is inserted through the central loop or eye of the link and then the overlapping ends of the link 11 are sprung onto the end of the pin in engagement with the notches 12b thereof, thereby, as already stated, quite rigidly securing the said elements in co-operative positions. Next, and finally, by a simple operation, the overlapping ends of the link 11 are placed between the electrodes of a welding apparatus and rigidly and permanently united or welded together. The split ring or link 11, before the welding operation above described has been performed and, in fact, before the said link is applied to the swivel pin, can be interlocked with a link of the so-called anchoring chain. While the link 11 is preferably substantially round, it may, of course, deviate from that form.

It will be possible to insert the swivel pin through the intermediate portion of a normal link and couple the link 11 to the projected end of said swivel pin and to thereafter distort said normal link to substantially the form shown in Fig. 6; but the first described and preferred order of the operations is the best or preferred order of operations.

What I claim is:

1. A link chain having a substantially oblong link, the sides of which are inwardly distorted to form an intermediate socket and looped ends, a headed swivel pin projected through said socket, and a chain link welded to the projected end of said swivel pin.

2. A chain structure including the structure defined in claim 1, and in further combination with chain links engaging the looped ends of said socket forming link, and another chain link engaged in the swivel link thus secured to said swivel pin.

JOSEPH B. BAMBENEK.